United States Patent [19]

Culp

[11] Patent Number: 5,309,056
[45] Date of Patent: May 3, 1994

[54] ENTROPIC ELECTROTHERMAL ACTUATOR WITH WALKING FEET

[75] Inventor: Gordon W. Culp, Van Nuys, Calif.

[73] Assignee: Rockwell International Corporation, Seal Beach, Calif.

[21] Appl. No.: 891,030

[22] Filed: Jun. 1, 1992

[51] Int. Cl.⁵ .................... H02N 10/00; F01B 29/08; F01K 25/04

[52] U.S. Cl. ..................................... 310/306; 60/516; 310/11

[58] Field of Search .......... 310/11, 306, 307, 40 MM; 60/516, 531, 910, 911; 717/52

[56] References Cited

U.S. PATENT DOCUMENTS

| | | | |
|---|---|---|---|
| 3,041,821 | 7/1962 | Lindberg, Jr. | 60/516 |
| 4,498,302 | 2/1985 | Djelouah | 60/671 |
| 4,509,328 | 4/1985 | Holzer | 60/528 |
| 4,543,788 | 10/1985 | Monreal Urzay | 60/531 |
| 4,583,365 | 4/1986 | John | 60/531 |
| 4,792,818 | 12/1988 | Eldridge et al. | 346/140 R |
| 4,928,030 | 5/1990 | Culp | 310/328 |

FOREIGN PATENT DOCUMENTS 0055868 4/1985 Japan ..................... 60/516

*Primary Examiner*—Steven L. Stephan
*Assistant Examiner*—D. R. Haszko
*Attorney, Agent, or Firm*—H. Fredrick Hamann; Harry B. Field; Steven E. Kahm

[57] ABSTRACT

The entropic echinoid 2 applies force to an object 6 with the cummulative effect of myriad feet 8 activated by fluid expansion pulses from electrical resistance heaters 30. Each heater lying in a fluid filed socket 10 of a substrate 4 and activated by a signal from a corresponding foot position sensing capacitor 26. The entropic echinoid is useful in high temperature environments for motors, actuators, bearings and clutches.

32 Claims, 3 Drawing Sheets

ENTROPIC ELECTROTHERMAL ACTUATOR WITH WALKING FEET

BACKGROUND OF THE INVENTION

1. Field of the Invention

The present invention generally relates to electrothermal fluid transducers and, specifically relates to transducers that smoothly and forcefully walk an object by myriad chaotic urgings.

2. Description of the Related Art

Applicant's copending application Ser. No. 07/807,667 filed Dec. 16, 1991 a continuation-in-part of Ser. No. 07/697,368 filed May 9, 1991 entitled Walking Expansion Actuator describes walking transducers that incorporate pulsed heaters that thermally pulse fluid to roll elements that affect forceful mechanical motions suitable for positioning an object by tractive walking. Microscopic and macroscopic embodiments of the apparatus are described, the former embodiment using a combination of epitaxial deposition methods to make both heaters and rolling elements, while the latter uses arts such as material forming and wire drawing. The described apparatus employs relatively intense and short electrical pulses in order to transduce the preponderance of the energy of an electrical pulse to mechanical work before the heat diffuses and mediates the thermal gradients necessary to affect a relatively high peak pressure. The apparatus is characterized by multiple heaters, each heater having a corresponding, essentially proximately, confined fluid portion, and by the mechanical summing of multiple mechanical transducer outputs.

Applicant's copending application Ser. No. 07/870,855 filed Apr. 20, 1992 entitled Thermal Urger comprises a multiplicity of small heaters arranged on a substrate surface proximate a fluid. An electrical heater pulse causes a short transitory thermal expansion pressure pulse in the immersing fluid. The pressure pulse propagates in and applies a transitory force to the fluid and to any co-immersed object. Pressure pulses have a character between that of a flowing fluid and an acoustic impulse. Cluster activation of heaters produces a prescribed temporal-spatial distribution of fluid pressure. Aperiodic activation of therger elements emulates a fluid force due to statistical gas molecule collisions. Embodiments of the present invention constitute electrically controllable fluid bearings, linear or rotary actuators and motors, acoustic transmitters and receivers, and modifiers of fluid boundary flow.

The animal class Echinoidea includes sea urchins, sea stars, and particularly the genus Ophiura (brittle sea stars), that walk sufficiently smoothly as to constitute gliding by the apparently chaotic activation of myriad tube feet. These animals glide smoothly in the senses that: smooth walking myriad feet need not entail rubbing and concomitant energy waste; and, walking accelerations are negligible. The sucking feet of echinoids, excluding the brittle stars, improve traction on slippery surfaces and in swift currents. The brittle star relies on the grips of myriad tiny "toes" in sea floor interstices. A typical echinoid has thousands of feet generally supported by and articulated from the pores of a madreporitic structure, typified by the underside pocked morphology of sand dollar and urchin shells. The glide obtains from a mechanical sum of forcible motional foot contributions, any one foot making relatively infrequent and fleeting contact with the sea floor. Echinoid walking may be compared to gas pressure.

The theory of statistical gas mechanics established that the microscopic activities of a collection of atoms or molecules causes the macroscopic effect measured as fluid pressure or force. Each molecule has a distinct velocity that changes after every collision. The average kinetic energy of molecules, and the average areal frequency density of molecular collisions with an impinged surface, is demonstrably the cause of the measurable macroscopic effect of gas pressure on that surface. Atoms or molecules lose no energy in the process of exerting pressure on the surface. The mean molecular kinetic energy does not run down with time, but is solely dependent on gas temperature, heat being the sustaining influence. Adding heat raises the temperature, speeds the molecules, and thereby raises the pressure. These principles are within the scope of the background of the present invention in the sense that the macroscopic effect (force, pressure, of feet) is causally related to the microscopic effect (kicks). An (imagined) improved statistical gas mechanics provides electrical remote control of the direction and speed of clusters of molecules (feet), so as to remotely produce predetermined temporal and spatial distributions of force exerted on the impinged surface of an object.

Entropy, in the context of the background of the present invention, is the measure of the inconvertibility of heat to work, and of the degree of disorderliness of apparatus component actions, both measures increasing with increasing entropy. Irreversibly dissipative transitory thermal processes (pulsed heaters), and myriad mechanical chaotic actions are considered entropic essences in the present context.

SUMMARY OF THE INVENTION

The present invention forcefully, efficiently and smoothly urges an object by the collective walking actions of electrically, semiautonomously activated myriad feet. The feet are dynamically free bodies retained and positioned in surface sockets of a substrate by fluid, electrostatic and electrothermal forces. Primary foot motive power derives from fluid pressure pulses due to electrically pulsed resistance heaters. A foot position sensor, and a heater pulser semiautonomously activate each foot. The minimum device electrical connections are a direct current line and a return line. Variants include linear or rotary actuators or motors, and electrically controlled fluid bearings. Embodiments are constructible from materials that extend high and low operating temperature limits through independence of a Curie temperature.

OBJECTS OF THE INVENTION

The primary object of the entropic echinoid is the controlled conversion of electrical energy to useful mechanical work by the trended chaotic action of myriad walking feet empowered by pulsatile fluid pressure generated by electrically and semiautonomously pulsed resistance heaters.

A secondary object of the present invention is forcefully positioning an object by smooth walking.

Yet another object is smooth walking by traction.

Still another object is smooth walking by intermittently engaged teeth.

Another object of the present invention is operation at temperature extremes that preclude reliance on material properties such as a Curie temperature.

A further object is relatively great tolerance to random component failures.

Objects of the present invention further entail the use of entropic echinoids for the construction of a variety of useful devices such as: bidirectional coaxial rotary motors; multidirectional linear motors and actuators; electrically controlled fluid bearings; fluid bearings that provide motive power to the borne component; and, these devices and variants thereof that operate satisfactorily throughout the temperature range of near zero to 2,000° K., or to temperature extremes dictated by the choice of the type of adjunct sensing and control components, whichever is narrower.

An additional object of the present invention is the direct conversion of chemoelectric energy into useful mechanical work.

A further object is the making of enchinoids using epitaxial material transfer and temporary heater element support means.

An additional further object is the making of echinoids using photolithography with additive and subtractive material transfer means.

DETAILED DESCRIPTION OF THE INVENTION

Figure 1:
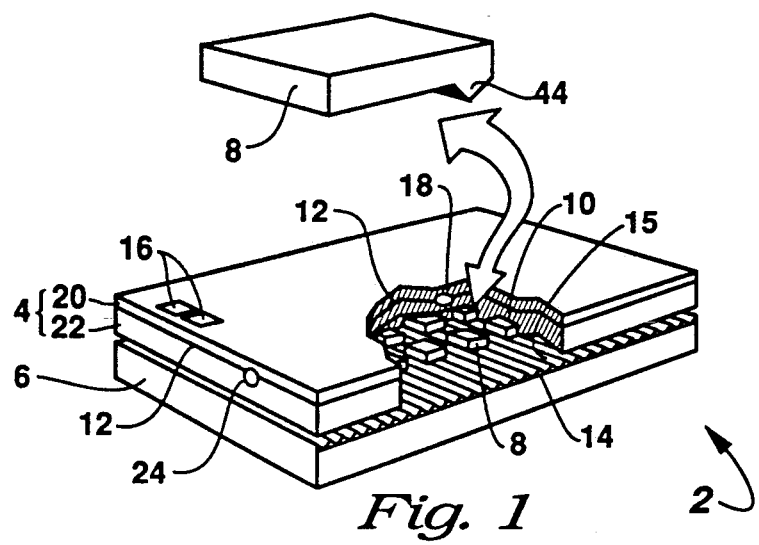
FIG. 1 is a perspective cutaway view of a portion of a planar entropic echinoid.

FIG. 1 is a perspective portion view of a toothed embodiment of the invention called an entropic echinoid 2, comprising substrate 4, a socketed surface portion 10 of substrate 4, urgeable object 6, and feet 8 immersed in fluid between substrate 4 and urgeable object 6. Substrate 4 further includes two or more layers, typically, 20, 22, electrical component and bus plane 12, internal fluid port 18, external fluid port 24, and electrical connections 16 to an external power source. Urgeable object 6 includes serrated (tooth-like) surface 14 having teeth 15, proximate socketed surface 10. Each foot 8 is a free body uniplanarly guided in a corresponding socket.

Other embodiments of the invention have the tooth 44 removed from the foot 8, such that the bottom of foot 8 contacts the object 6. The object may have a smooth, rough or toothed surface rather than the serrated surface depicted. In the simplest embodiment a single heater may be placed in the upper left corner of the socket. The heat pulses from the heater would drive the foot forward and downward to make contact with and drive the object.

In other embodiments the socket is just wide enough to restrict the foot to piston-like up and down strokes in the socket. In these embodiments the heater would be centered above the foot and either adjust the foot gap between the object and the foot for uses in hydrostatic bearings or have the foot touch the object for use as clutches and brakes. Many other variations of this and the following embodiments of the invention will be apparent from the following descriptions.

Figure 2:
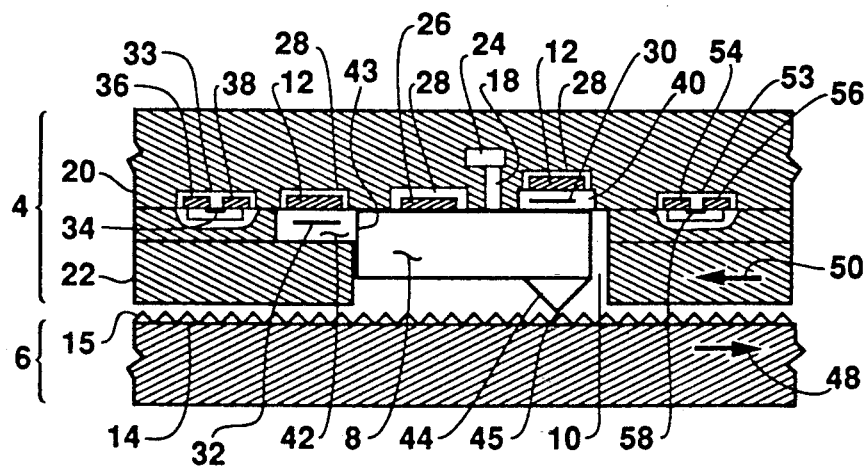
FIG. 2 is a quiescent cross section view of one foot of a toothed embodiment of an entropic echinoid.

FIG. 2 is an enlarged portion cross section of the device of FIG. 1, showing a foot 8 in socket 10 of substrate 4. The figure more clearly shows tooth-like toe 44 of foot 8, and components of substrate 4, including heaters 30, 32, electrical buses 12, capacitor electrode 26, internal fluid port 18, external fluid port 24, and electronic switches 33, 53. The figure shows a quiescent foot 8 during relative motion of substrate 4 and object 6 in directions 48, 50 caused by the action of other feet (not shown). By way of example, said electronic switches 33, 53 may be switching transistors consisting of a gate 34, an emitter 36, and a collector 38, and corresponding components 54–58. Electrical buses 12 and capacitor electrode 26 require electrical insulating layers 28 when layer 20 and foot 8 are electrical conductors or semiconductors. Foot 8, heaters 30, 32, socket 10 and serrated surface 14 are in contact with or immersed in fluid, which may be supplied by port 24. A main electrical bus (omitted) provides electrical power from external connections (16, FIG. 1) to the vicinity of each foot of an independently electrically activatable subset of feet. A heater, for example, heater 32, may be a wire, a wire-like member, or a ribbon of electrical resistance material electrically connected and supported at at least two locations (supporting connections omitted for clarity). Switches 33, 53 connect the main electrical bus to heaters 30, 32 by way of distribution buses 12. A similar electronic switch (not in the plane of the figure) is connected to and controls capacitor electrode 26. The surface portion of electrode 26 proximate foot 8 may include a thin film of electrical insulation (omitted) to inhibit current flow. Toe 44 may ride the teeth 15 of serrated surface 14 and, alternatively, a steady electric charge on capacitor electrode 26 may retain foot 8 up off the teeth as shown in FIG. 2. A steady current on electrode 26 continues to provide force attracting foot 8, while an alternating signal of appropriately elevated mean potential is superimposed on electrode 26 to measure the distance therefrom to foot 8. The capacitance, wherein foot 8 acts as the complementary capacitor electrode, and therefore foot position, is related to the distance between electrode 26 and foot 8, which is in turn proportional to the capacitance. The alternating signal is used to measure the capacitance which, following calibration of the apparatus, is used as a measure of foot position. Preferred practice is the use of an adjacent pair of capacitor electrodes, the capacitance difference being a measures of foot slope, while the capacitance mean is a measure of foot position relative to the plane of substrate 4. Clearance 45 between toe 44 and teeth 15 prevents interference when foot 8 is fully retracted as shown in the figure.

Figure 3:
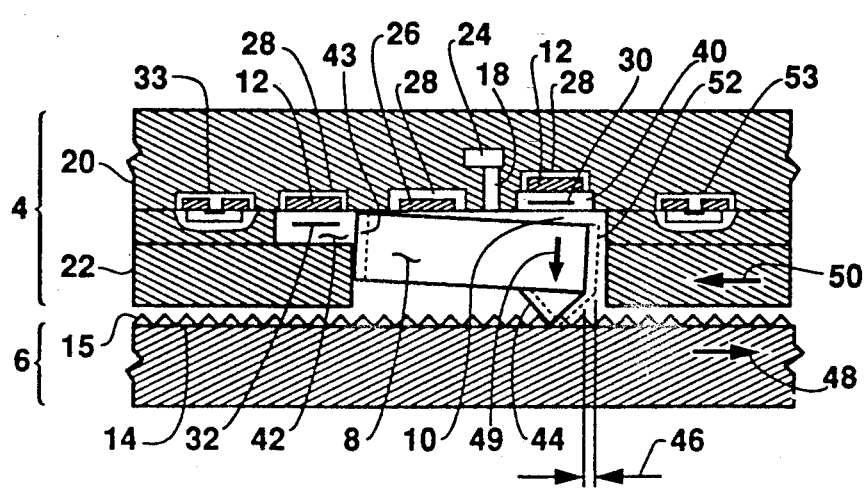
FIG. 3 is an activated view of the apparatus of FIG. 2.

FIG. 3 is the apparatus of FIG. 2 showing an activated foot 8 at the instant of time of pulsing heaters 30 and 32. The pulsing was initiated by the sensing of the state of charge, and equivalently, by the resonance frequency of the circuit portion of which capacitor electrode 26 is a component, that indicates that toe 44 has sufficiently engaged teeth 15. The pulsing is affected by passage of current from the main bus to heaters 30, 32 by way of switches 33 and 53 via buses 12. The current pulse in heater 30 rapidly thermally expands fluid 40, the pressure of which forces foot 8 in direction 49. The pressures, both in the downward direction 49 and the forward direction 48, cause foot 8 to execute a forceful stroke 46 (broken outline), the impetus of which adds to the action that, in the figure, continues relative motion 48, 50.

After the pulse has subsided, foot 8 is again a free body waiting for another forceful stroke. During the wait, a combination of electrostatic force of capacitor electrode 26, and relatively low pressure from fluid port 24, positions foot 8 in preparation for the next forceful stroke as indicated in FIG. 2. The cycle continues for the illustrated foot, and for myriad similar feet, as long as electrical power and fluid are available. The operating cycle is described in more detail in conjunction with FIGS. 10-12 infra.

Analogous to the statistical gas mechanics, the force and stroke on object 6 is the average over time of myriad forceful strokes 46 contributed by feet 8. The smoothness of the forceful motion is proportional to the frequency of semiautonomous foot activations, and to the number of feet contributing stroke portions.

The present invention includes diverse embodiments that differ in the number, type, and location of components that control foot positions and forces. Each embodiment has a variety of combinations of sequences, times, and selection of particular components to activate. By way of example, a particular configuration of the embodiment shown in FIGS. 2 and 3, operates without activating heater 30. The foot 8 has a heel 43 and a toe 44. The particular configuration requires the shape of toe 44, teeth 15, and the moment subtended by the line between heel and toe contacts, to urge toe 44 toward teeth 15 without slipping. The arrangement of components that favors this condition during all anticipated operating conditions may obviate the need for heater 30 and switch 53. Adjustment of the pressure of fluid from port 24 may also be used to maintain nonsliding toe contact during pulsing of heater 32. FIGS. 4-9 schematically show example embodiments of foot control force components and foot force vectors (arrows). The force vectors are shown having uniform magnitudes (equal length arrows), while in preferred embodiments the magnitudes may differ substantially from those shown in accordance with each particular instant in the activation cycle, and in accordance with the intensity with which each force control component is activated. Substrates and positioned objects are omitted from FIGS. 4-9 for clarity, as are forces due to contact of the foot 8 with the substrate socket 10. Although control of the fluid force 64 is included in the scope of the present invention, its use is also omitted from the present description in the interest of clarity.

Figure 4:
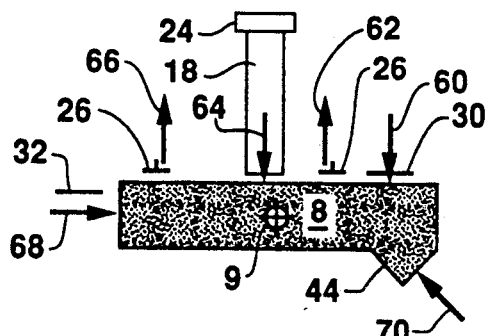
FIG. 4 schematically illustrates one embodiment of the free body force states of the foot as influenced by the collective forces of capacitors, heaters and ports.

FIG. 4 schematically illustrates a unidirectional foot 8 with separated capacitor electrodes 26, the other components obtaining from FIG. 3. Foot 8 is a free body that responds with forceful translations and rotations in six possible directions. Translation normal to foot sides, and rotation about a substrate normal are bounded by socket side walls. Translations in primary action directions (48, 50, FIG. 3) are bounded by socket length, the excess socket length generally being equal to or slightly greater than the largest anticipated power stroke. Therefore foot motion at all cycle portions other than during the power stroke portion is that of a free body subjected primarily to the vector sum of forces applied during power strokes, and secondarily by relatively weak guiding forces from object teeth and socket walls. When not activated, the foot seeks a position of minimum potential energy relative to the local gravity vector, to fluid pressure (if any), and to residual electrostatic forces (in some embodiments).

The average capacitance of the electrode pair 26 is a measure of foot position, while the difference of capacitance measures foot rotation angle. Each of the electrodes 26 produces a rotary moment about the center of mass 9 of the foot, one moment having a sense opposite that of the other, while the magnitudes of moments are proportional to the perpendicular distance from the respective vector to the center of mass. For example, if the center of mass of the foot is located at 9, the magnitude of the moment from force 66 is greater than the magnitude of the moment due to force 62.

During a power stroke, the dominant foot forces are: power pulse 68 from heater 32, and toe reaction force 70. Forces 68 and 70 are not colinear and abutting, resulting in a moment that tends to rotate the foot counterclockwise in the figure. This moment is complemented by any combination of fluid port pressure 64, heater 60 pressure, and secondary forces, if any.

Figure 5:
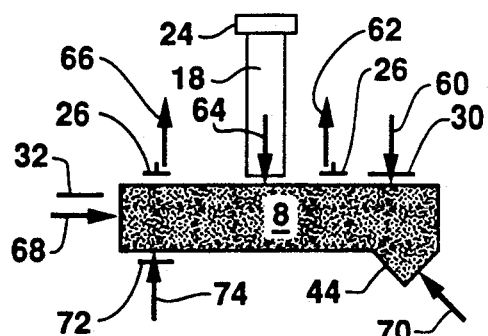
FIG. 5 schematically illustrates a second embodiment of the free body force states of the foot as influenced by the collective forces of capacitors, heaters and ports.
Figure 6:
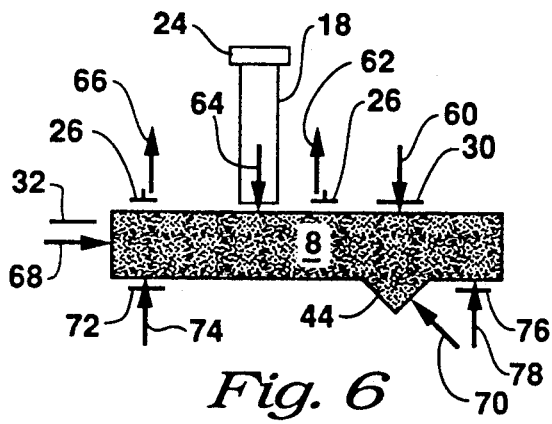
FIG. 6 schematically illustrates a third embodiment of the free body force states of a foot having a displaced toe as influenced by the collective forces of capacitors, heaters and ports.

FIG. 5 is a variant of the unidirectional foot of FIG. 4 further including heater 72 that provides foot retracting force 74. This force is applied to fully retract the foot between power strokes to reduce wear of toe 44 and urgeable object teeth. Force 74 may, for example, add to electrostatic socketing forces 62, 66, from capacitor electrodes 26, and negate fluid force 64. FIG. 6 is a variant of the foot of FIG. 5 further including heater 76 that provides socketing force 78 to reduce toe wear between power strokes. Heater 76 may operate in concert with heater 72, and alternatively, may supplant heater 72, thereby constituting another variant.

The foregoing variants are unidirectional, and urge object motion only in one direction. Embodiments of the entropic echinoid having unidirectional feet rely on selected activation of groups of feet to move in more than one direction (at a time). All the feet of a group force in the same direction. For example, a first group urges motion to the right of the figure, while a second group, activated separately during distinct non-overlapping time intervals, urge to the left of the figure. Additional groups may urge normal to the plane of the figure, and so forth. Feet of two or more groups may be spatially mixed in a discrete or in a random fashion, in accordance with the choice of electrical circuit arrangement. Two simultaneously activated foot groups that urge in opposite directions and are spaced apart urge relative rotary motion, but the configuration of a particular toothed embodiment limits the extent of rotary angle. Intentional small angle adjustments advantageously maintain a preferred tooth engagement, thereby reducing stress and wear, and thereby angularly positioning some urgeable object in accordance with an external requirement. Small rotations during operation of the apparatus obviates the need for conventional bearings and other guiding means.

Figure 7:
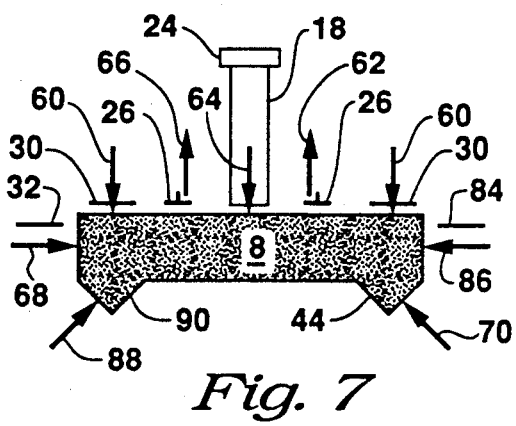
FIG. 7 schematically illustrates a fourth embodiment of the free body force states of a foot having two toes as influenced by the collective forces of capacitors, heaters and ports.

FIG. 7 is a bidirectional variant of the foot of FIG. 6, further including heater 84 and toe 90, the arrangement being essentially symmetric about the center plane of the foot. Activation of heater 32 causes reaction force 70, thereby urging the object (omitted) to the right in the figure, as previously described. Similarly, activation of heater 84 causes reaction force 88, thereby urging the object to the left of the figure. Bidirectional feet increase the areal density of feet in the substrate, and reduce by half the number of capacitor electrodes and fluid ports needed. Increased areal density advantageously essentially doubles the shear pressure (tangential force per unit of substrate area), other operating conditions remaining similar to those of unidirectional foot embodiments.

Another method of activating the embodiment of FIG. 7 during retrace from strokes to the right of the figure using heater 32, is pulsing of heater 84 to shorten the wait for the next power stroke. As an aid to retracing, the pulse delivered to heater 84 needs have but a fraction of the intensity as when heater 84 executes a power stroke. Conversely, heater 68 is weakly pulsed to affect a more rapid retrace when power strokes to the left of the figure are executed by heater 84.

Figure 8:
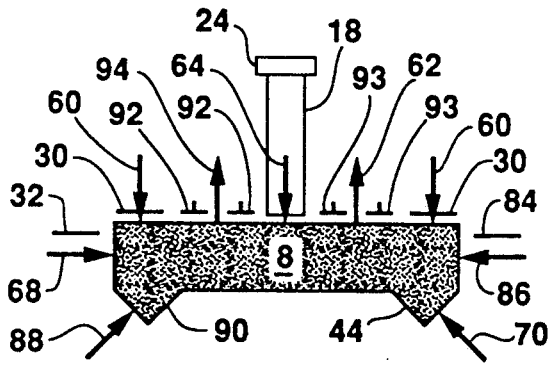
FIG. 8 schematically illustrates an embodiment as in FIG. 7 having additional capacitors.

FIG. 8 is a variant of the apparatus of FIG. 7, further including two pairs of capacitors 92, 93. As previously described, a capacitor pair provides steady and alternating charge measurements at essentially the same location on the surface of a foot. In addition, an electrode pair produces force and capacitance change information that is relatively independent of the electrical conductivity of the body of the foot. The foot may be an insulator, may have a high or a low dielectric constant, may be a semiconductor, and may be a metal. An activating variant provided by a semiconducting or a conducting foot is the repulsion of the foot by applying an electric charge of a particular polarity to the foot (electrical connection omitted from figure), then applying the same electric charge to one or both electrodes of the pair. Foot repulsion derives from the repulsion of like electrostatic charges. The added electrode pair 92 provides foot socketing force 94 when activated with opposite polarity, and urges greater toe engagement when activated with the same polarity. Commanding attraction and repulsion forces in selected combinations of capacitors 92 and 93 contribute to foot positioning, for example, to ascertain the degree of tooth engagement in anticipation of a power stroke.

Figure 9:
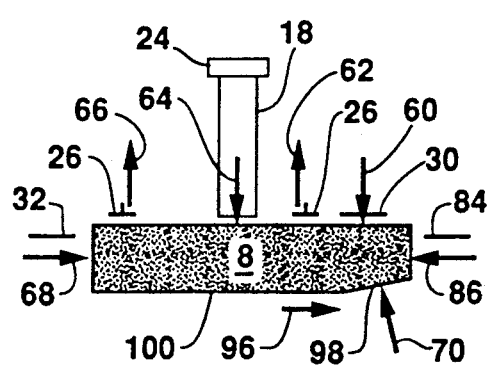
FIG. 9 schematically illustrates a unidirectional traction embodiment of a foot having a sole rather than a toe.

FIG. 9 shows one example of a unidirectional traction embodiment of the foot, including capacitors 26, heaters 30, 32, 84, and having sole 98 rather than a toe (single tooth). Sole 98 contacts an untoothed surface of an object and urges it to move tangentially relative to the plane of the surface. As previously described, capacitors 26 determine the vertical foot position. However, traction of sole 98 may commence regardless of the relative positions of foot, substrate, and urgeable object. It is therefore advantageous to measure the tangential position of the foot relative to its socket. The illustrated embodiment uses, between power strokes, a combination of heaters 32, 84 as capacitor electrodes. Being located at the foot ends, and being stationary relative to the socket, heater capacitance is a measure of instants when the foot has achieved its extreme retrace position in the socket and is ready for a power stroke. The power stroke may consist of pulsing heater 32, resulting in tangential stroke force 68. Force 70 is the normal force of traction of sole 98 with the surface of the urgeable object. Sole friction, force 68, and force 70 resolve into tangential force 96 that urges object motion. However, without additional activations normal force 70 will be relatively small, and may be zero. Therefore, heater 30 is activated just before or simultaneously with heater 32, whereupon force 60 significantly increases normal force 70, which in turn increases tangential force 96.

After a power stroke, capacitor force 62 retracts the foot to reduce wear of sole 98, and to position the foot near heater 84 so as to reduce the power needed by heater 84 that retraces the foot with force 86. Alternatively, capacitor forces 62 and 66 may affect full retracting of the foot to overcome fluid force 64, if necessary.

The bidirectional embodiment of the traction variant consists of a symmetric arrangement of the components to the right of the center plane of fluid port 24 of FIG. 9, mirrored about that plane. Rotary operation requires simultaneous activation of two, spaced, antiparallel subsets of feet. Biaxial traction embodiments further comprise at least two sets of feet that direct mutually perpendicular action, thereby providing positioning of the object relative to the substrate anywhere in the object's plane. Combinations of rotary and translatory foot set activations provide corresponding combinations of biaxial translation in the device broad plane and rotation about any line normal to that plane.

Figure 10:
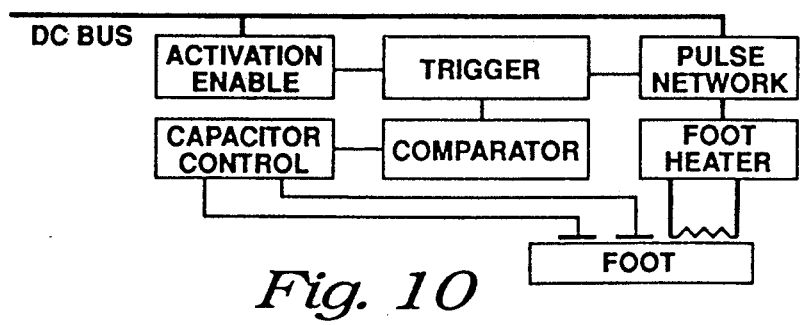
FIG. 10 is a simplified schematic diagram of electrical components adjunct to a foot of the present invention.

FIG. 10 shows a simplified schematic diagram of a representative control circuit for, by way of example, the apparatus of FIG. 4. One or more foot heaters are connected by a pulse network to a DC (direct current) power bus. A control line connects the pulse network to a trigger circuit. The DC bus is sensed by an activation enable logic circuit and provides an enable signal to the trigger circuit when predetermined status obtains. One element of status is determined by a comparator that receives an analog signal from a capacitor control. The capacitor control is connected to the capacitor electrodes and provides a steady charge level to generate electrostatic force, and superimposes an alternating charge with appropriately elevated mean potential to determine capacitance, and thereby, to determined foot position. The comparator supplies a logic level to the trigger, thereby enabling a power stroke activation.

Figure 11:
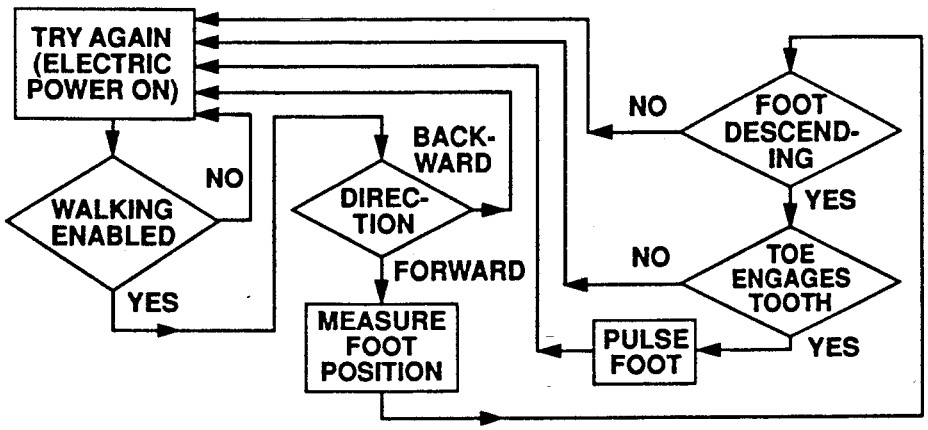
FIG. 11 is a simplified operational logic diagram of the circuits of FIG. 10.

FIG. 11 is a simplified operational logic flow diagram exemplary of the functional sequence of ACTIVATION ENABLE box in the circuit of FIG. 10 and the unidirectional (in this case, forward) apparatus of FIG. 2 by way of example. A simple interface to an externally supplied command and power source may use a 2-wire power connection. The apparatus thus regards the application of electrical power as a walking enabling signal. Similarly, a simple 2-wire interface may establish the commanded direction of walking by the selection of one of the two possible power polarities. Alternatively, a separate enabling signal connection may be provided (not shown), and a separate walking direction signal line (also not shown) may be supplied. Once walking enable is established yes, the desired direction is determined. If the direction is backward, inappropriate for the present foot, control returns to try again, the beginning of the loop. When the direction is determined forward, the foot is queried for descendency. A no answer (ascending foot) returns to the try again (wait state). These first two return paths to try again are very short, entail relatively short electronic delays, and therefore provide high frequency status determination. When foot descending is yes, tooth engagement is tested, a no returning to try again. A faster query obtains from returning from tooth engaged to its input, but risks missing a walking disable state, resulting in unintended foot activation. When tooth engaged is yes the foot is provided a power pulse and query reverts to try again.

Figure 12:
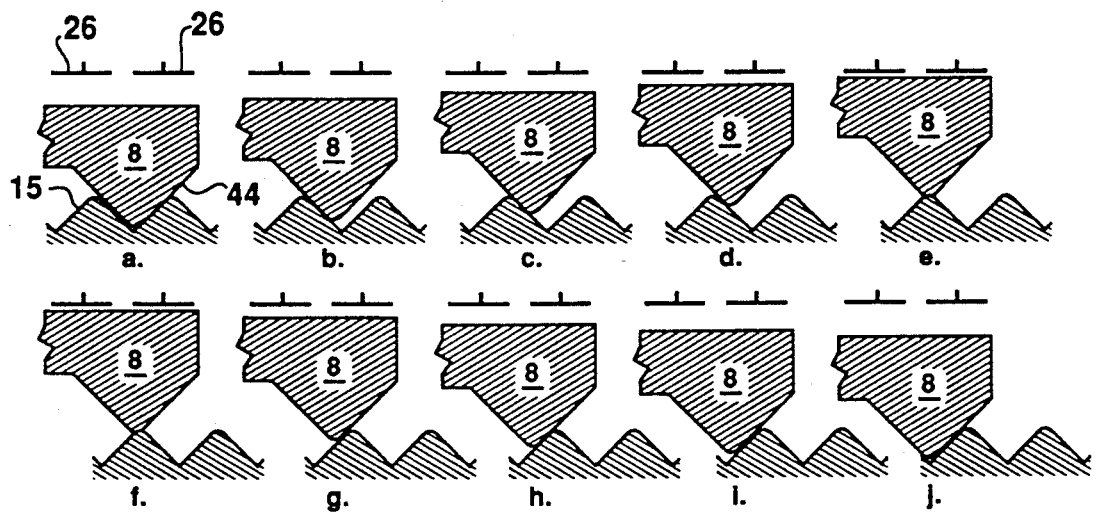
FIG. 12 is a cross section animation of the toothed variant of the present invention.

FIG. 12 shows a ten frame animated sequence of tooth positions intended to clarify the queries of FIG. 11. In each frame object teeth 15 are moving to the right of the figure at constant speed as a result of summed urgings of other feet. Capacitor electrodes 26 are shown in each frame as a position reference for the top of the foot, and to illustrate that increasing capacitance indicates an ascending foot, while decreasing capacitance heralds a descending foot. Frame a shows full engagement of toe 44 immediately after a power stroke. The toe is allowed to lightly ride and ascend tooth 15 in frames a through e. Frames f through i show toe descent. When full toe engagement is reached, as shown in frame j, a power stroke is initiated. In practice, a power stroke may be initiated before full toe engagement obtains, for example, in any of frames h, i, or j. The extent of toe engagement obtaining at power pulse initiation depends on the strength of the components and a desired rate or wear, fatigue, and deformation of tooth profiles.

In the two-wire electrical supply embodiment described, one method of control uses voltage adjustment to control speed. As system voltage increases, proportionally larger currents flow when heaters are semiautonomously pulsed, resulting in greater pressure, and concomitant larger "kick" from each foot. More intense foot impulses increase a combination of force and speed on the urgeable object. Another method of two-wire control is the use of a current-controlled electrical power source, whereby reduced system current availability results in less intense foot impulses, lower speed, and lesser force, and combinations thereof, of the urgeable object.

Another method of control of embodiments having interfoot communications connectivity is sending global, or area-specific commands to alter operating states in a prescribed manner. Such states include pulse height, pulse width, pulse period, pulse delay time, and predetermined combinations of these that produce a desired combination of speed, force, acceleration and the like on the urgeable object.

A class of applications of the preset invention requires a "fail free" capability. When power fails, or is intentionally interrupted, the unpowered apparatus permits countertranslation of substrate and object; toes lightly ride the substrate teeth; and in the case of the traction embodiment, soles lightly slide on the traction surface of the object.

Another class of applications of the preset invention requires a "fail locked" capability. Both the unidirectional and the bidirectional foot embodiments provide locking on command, when power fails, or when power is intentionally discontinued, by activating selected foot forcers. When foot forcing is electrical, a reserve ancillary electrical power source is called into action. Solely fluid pressure suffices to move a subset of feet into locked engagement. Only a fraction of the feet can passively lock because the majority of feet are, at any given instant, in positions that do not allow locking.

When both electrical power and supplied pressure of fluid cease, external compressive urgings may bring unguided substrate and object into contact, the force resisting countertranslation being proportional to the product of the nonsliding coefficient of friction and the compressive normal force.

Toothed variants are locked by forcing a fraction of the feet of an appropriate direction to the positions of tooth interference. Only a small fraction provides sufficient locking for the majority of applications, allowing the free feet of that direction to unlock the apparatus when so commanded, or when the interruption of electrical power is discontinued.

The traction embodiment (FIG. 9) locks by increasing fluid pressure in all ports 24. The increased pressure on the upper foot surface urges the foot toward the object, increases normal force, not just in the sole 98, but on the entire undersurface 100 of the foot. Increased fluid pressure thereby locks all feet firmly against the object, generally providing several times the force resisting countermotion as is normally available from activation of subsets of feet. If fluid pressure also fails, external compressive urging provides locking as previously described.

When power is resumed, the majority of unlocked feet are activated to overcome locking forces, thereby restoring the apparatus to normal operation. Tractive embodiments resume normal operation without further interdiction.

The fluid of port 24 of the illustrated embodiments and variants thereof, in addition to providing the expansive transduction of heat to mechanical action, immerses each foot and ameliorates by viscosity the intensity of shock contacts with socket walls in the manner of a fluid film bearing. Fluid may stand in each socket. Alternatively, fluid may flow out between the substrate and the urgeable object. Standing fluid, given appropriate static pressure, provides a predetermined fluid film bearing between countertranslating components in counterforce to externally applied compressive loads. Foot position signals, and alternatively, an average of a subset of foot position signals, may be used by a pressure control means to maintain a predetermined separation between substrate and urgeable object by appropriate secular adjustment of pressure, for example, to a supply duct (24, FIG. 1).

Standing fluid transfers used heat from the heaters and its own body to the socket walls and thence to the body of the substrate and the urgeable object by dint of thermal conductivity and thermal diffusivity. Flowing fluid enhances heat transfer by physically carrying absorbed heat to the exterior of the apparatus. Flowing fluid also removes entrained and internally generated granular debris from the interior, thereby increasing the useful life. Granular ingress from a dusty external environment is precluded by the constant flow and relatively high exit flow velocity through slits or labyrinths (not illustrated), providing the function of seals in the conventional sense, but avoiding the sliding losses and additional granular debris generation concomitant with conventional seals.

While planar embodiments of the present invention have diverse applications, plane substrates are curved into cylinders, and planar urgeable objects are made into cylindrical shafts to constitute the present invention in the forms of: rotary actuators; rotary motors; linear actuators; linear motors; compound linear and rotary actuators or motors; and, bearings.

The present invention includes fluid bearing embodiments wherein soles glide on a fluid film proximate a smooth shaft surface. Referring to FIG. 9, the broad undersurface 100 of foot 8 is the bearing sole conterminous with sole 98. In use, the bearing force 70 would move opposite force 64, and force component 96 will represent the direction of shaft surface travel and the viscous drag of the bearing fluid as the shaft surface moves opposite direction 96. Heater 30, and any other heaters proximate the foot upper surface, provide electrical control of local pressure on the fluid film and thence the shaft surface.

A subclass of fluid bearing embodiments includes hydrodynamic bearings that sustain the fluid film thickness by a combination of fluid viscosity and continuous fluid film motion toward the sole 98. Another subclass includes hydrostatic bearings each foot of which has a through hole that passes fluid from a supply port, for example, port 18, to the sole surface of the foot. Soles of these subclasses of bearings provide shaft support by a portion of the area of the substrate. Alternatively, the entire support of the shaft may rely on hydrostatic or hydrodynamic film support exclusively within the sole areas. Feet, being free but guided bodies, self align to the shaft surface and have inherent film energy minimization. In applications benefiting from other than minimum film energy orientation of soles, feet are adjusted to a predetermined position and attitude relative to the shaft to provide the desired distribution of energy within the fluid film.

Bearing embodiments also provide motive power to the shaft that completes the bearing by tangential activation of feet as previously described. A subclass of motivated bearings relies on transmission of foot urgings to the shaft through the viscous drag of the fluid film. Another subclass forces the sole, or a portion of the sole to pierce the fluid film and motivate the shaft by solid-solid traction. Still another subclass of bearings may have serrated shaft surfaces, the serrations being engaged and urged by toes of a subset of feet, while another subset of feet provides bearing action alone, and combinations thereof.

Feet and the socketed surface may lie on the inner cylindrical surface of a tubular substrate, and alternatively, feet and sockets may be added to the external surface of a cylindrical shaft, in accordance with prescribed methods of making same. Cylindrical embodiments rely on elastic rigidity of the tubular substrate to provide compressive urging of the fluid between counter-rotating or countertranslating parts, rather than an external compressing means. As previously described, fluid, which is essential to the operation of the present invention, will be present in all embodiments, and can therefore advantageously combine the bearing function by fluid film with the motive means of entropic echinoid feet. Therefore, the shaft and tube embodiment of the present invention constitutes an electrically controlled, electrically propelled bearing/motor/actuator, any combination of the functions of which is advantageously remotely electrically activated in accordance with the needs of a particular application.

The electrically propelled embodiment of the present invention is applicable to high speed rotary machines such as the gas and liquid turbines used to pressurize and deliver rocket propellants. These machines incur severe shock loads and undesirably rapid bearing degradation when started and stopped. Run-up and slowing of the power shaft by electrical activation of its bearings reduces shock loads and retards bearing wear. The benefits of electrically controlled shaft centering are described in Applicant's copending application Ser. No. 07/870,855 filed Apr. 20, 1992 entitled Thermal Urger.

All embodiments are easily made of materials that do not rely on a Curie temperature that determines a necessary physical property, such as piezoelectric and magnetic materials. Curie temperatures generally restrict the upper and lower bounds of temperature at which the desired properties are retained. Resistance heaters and capacitors advantageously provide a wider functional temperature range than other electromechanical components. Therefore, given switches with the necessary operational temperature range, and alternatively, switches located external to and thermally isolated from the body of the entropic echinoid, embodiments function as expected in a temperature range from near zero to 2,000° K.

One method of making entropic echinoids is epitaxial deposition and erosive removal of material. These methods are used to fabricate the teeth of an urgeable object, and all of the described components of the socket substrate, the feet, and excrescences of feet appropriate to a particular embodiment. Epitaxial fabrication, also called micromachining, is useful because the components are relatively small and intricate, falling between the granularity of components made by known and ancient macromachining methods, and the fineness of elements of an electronic integrated circuit.

A representative method of making an entropic echinoid consists of the steps of: deposition of a substrate layer; application of an insulating layer; masked addition of electrical conductors; application of removable support layers; masked application of heaters and capacitor electrodes; deposition, growth and diffusion of active electronic components; additive interconnection of electrical components; application of additional removable layers; masked growth of feet and substrate material to form sockets; and finally, extraction of removable temporary support layers. Capacitors are charged to electrostatically retain feet during handling after release by extraction of removable layers. When dry, capacitors may remain sufficiently charged to retain feet in respective sockets for long periods without connection to an electrical source. A thin film of abrasion resistant and slippery material is added to socket surfaces to prolong life, particularly of high temperature embodiments.

Figure 13:
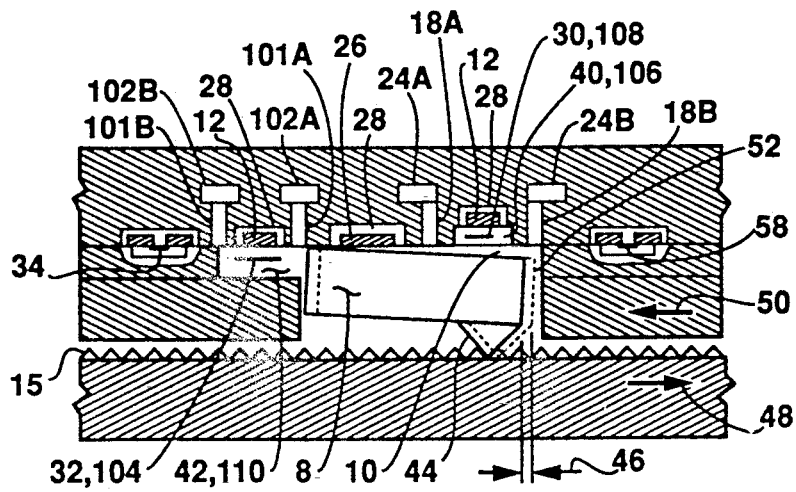
FIG. 13 is a cross section view of a chemoelectric exobaric embodiment of the apparatus of FIG. 3.

FIG. 13 is a cross section of an echinoidal element comprising, in addition to the components of FIG. 3, any combination of: catalytic coatings 104, 108 of heater elements 32, 30; catalytic coatings 106, 110 of surfaces of cavities 40, 42; fluid ingress ducts, 18A, 18B, 101A and 101B; fluid ingress ports 24A and 24B of cavity 40; and, fluid ingress ports 102A and 102B of cavity 42. The embodiment using all of these additional components converts two or more fluids from ports 24A-24B mixed in cavity 40, and fluids from ports 102A-102B mixed in cavity 42, respectively, by catalytic heaters 30, 32, to exobaric energy by the combined action of respective heater heat, the enhanced activation of mixed fluids by catalytic heater coatings 104, 108 by said heat, the enhanced activation of catalytic coatings 106, 110 of surfaces of cavities 40, 42 by the light radiated by respective heaters, the action of the catalysts on the mixed fluids in respective cavities, the chemoelectric conversion of the mixture to heat, to one or more species of chemical by-products, and to pressure pulses that are converted to useful mechanical work as produced by foot 8.

For example, a first fluid may be hydrocarbons such as methane or a mixture of carbon-bearing gases, and a second fluid may consist of one or more oxidizers such as oxygen, that upon mixing and being activated by the catalyst, "crack" to form hydrogen that reacts with the oxidizer to form exobaric by-products that may include steam.

A fluidly closed variant uses a single fluid that reversibly produces exobaric pulses responsive to heater temperature. By way of example, a polyatomic molecule may be temporarily dissociated by the concerted action of heater heat, heater light (primarily infrared), and catalysts. The exobaric dissociation produces the desired pressure pulse, while the catalyst or catalysts, over a relatively greater time span between pulses, and at a lower temperature, favors recombination of the dissociated constituents into the parent fluid, thereby allowing fluidly closed operation.

Practice of this embodiment of the present invention includes sizing fluid ingress ducts such as 18A, 18B, 101A, 101B and controlling the flow of admitted fluids in a manner prescribed to restrict chemoelectric reaction to the immediate vicinity of the catalytic surfaces as a minimum, and to the immediate vicinity of respective heater cavities as a maximum, as chemoexobaric excitation elsewhere contributes less to the intended conversion of chemoelectric energy to desired mechanical work.

Clearly, the energy density available from chemoelectric exobaric conversion exceeds the energy density produced by solely temporarily raising the temperature of a fluid. In fluidly open embodiments of the present invention, the entropic and chaotic manner of operation provides the time needed between exobaric pulses for the replenishment of reactive fluids and the expulsion of fluid reaction products. Also clear will be the advantageously smaller volume displaced by water or other liquid condensation by-products that contributes to the extremes of pressure thus generated, particularly when the apparatus is operated in a predetermined average temperature and pressure range that favors condensation.

It is emphasized that the mechanical work provided by the catalytic and chemoelectric embodiments herein described is the sum of the chemical exobaric contributions, and the previously described thermal contributions due to electrical pulsatile heating of the working fluid or fluids, any of which may contribute an equal or preponderant portion of the work in accordance with the particular embodiment.

In other embodiments the tooth 15 on the foot can be located in the middle of the foot 8 or any place on the foot, or the foot may have no teeth at all.

The foot 8 may be driven up and down relative to the object 6 by a combination of heaters and capacitors. When the object is engaged by the foot, the foot may be translated so as to move the object in the desired direction by heaters.

In other variations, the object may have a smooth surface or a serrated surface with uniform rows of teeth, may have a rough surface, or may have individual teeth scattered at random.

In other variations the feet may be distributed annularly so as to engage and move objects on curved paths. Alternatively the feet may be disposed at angles to one another to provide motion in any direction as a vector sum of the angles. Further, the feet may be disposed at various angles to each other at different locations for turning an object.

Applicant's copending application Ser. No. 07/807,667 filed Dec. 16, 1991, a continuation-in-part of Ser. No. 07/697,368 filed May 9, 1991, entitled Walking Expansion Actuator is hereby made a part hereof and incorporated herein by reference.

Applicant's copending application Ser. No. 07/870,855 filed Apr. 20, 1992, entitled Thermal Urger, is hereby made a part hereof and incorporated herein by reference.

Applicant's U.S. Pat. No. 5,043,621 issued Aug. 27, 1991 entitled Piezoelectric Actuator is hereby made a part hereof and incorporated herein by reference.

Applicant's U.S. Pat. No. 4,928,030 issued May 22, 1990 entitled Piezoelectric Actuator is hereby made a part hereof and incorporated herein by reference.

Although the present invention has been described with respect to specific embodiments thereof, various changes and modifications may be suggested to one skilled in the art. Therefore, it is intended that the present invention encompass such changes and modifications as fall within the scope of the appended claims.

What is claimed and desired to be secured by Letters Patent of the United States is:

1. An electrothermal actuator comprising,
   a substrate having a plurality of sockets containing fluid,
   an object bounding the fluid proximate the sockets,
   each socket containing a foot, the foot bounded by the socket and the object,
   each socket having at least one heater for creating pressure pulses in the fluid to position the foot relative the object,
   a means of activating the heaters thereby moving the object.

2. An electrothermal actuator as in claim 1 wherein,
   the foot has a top surface, a bottom surface, a front surface, a rear surface and two side surfaces,
   each socket has a top surface having a heater, a front surface, a rear surface and two side surfaces,
   where the socket dimensions restrict the foot to up and down motions in the socket.

3. An electrothermal actuator as in claim 2 wherein, the top surface of each socket has a capacitor.

4. An electrothermal actuator as in claim 2 wherein, each socket has a capacitor.

5. An electrothermal actuator as in claim 1 wherein,
   each foot has a top surface, a bottom surface, a front surface, a rear surface and two side surfaces,
   each socket has a top surface, a front surface, a rear surface and two side surfaces,
   a heater on the top surface of each socket and a heater on the rear surface of each socket,
   where each sockets' dimensions restrict each foot to up and down motions and front to rear motions in each socket.

6. An electrothermal actuator as in claim 2 wherein, the object is a shaft and the substrate surrounds the shaft.

7. An electrothermal actuator as in claim 1 wherein, each foot has a top surface, a bottom surface, a front surface, a rear surface and two side surfaces, each socket has a top surface, a front surface, a rear surface and two side surfaces, each socket dimensions restrict each foot to up and down motions and front to rear motions in each socket, a heater on the top surface of each socket, a heater on the rear surface of each socket, wherein each foot engages and moves the object.

8. An electrothermal actuator as in claim 7 wherein, each socket has a heater one each front surface.

9. An electrothermal actuator as in claim 7 wherein, each socket has a capacitor on one of the sockets' surfaces'.

10. An electrothermal actuator as in claim 9 wherein, each capacitor is used in a means of measuring the position of each foot.

11. An electrothermal actuator as in claim 9 wherein, each capacitor electrostatically positions each foot.

12. An electrothermal actuator as in claim 10 wherein, each capacitor electrostatically positions each foot.

13. An electrothermal actuator as in claim 9 wherein, each socket has a fluid port for adding said fluid to each socket.

14. An electrothermal actuator as in claim 7 wherein, the bottom of each foot has a tooth for contacting the object.

15. An electrothermal actuator as in claim 14 wherein, the tooth is at the front of each foot.

16. An electrothermal actuator as in claim 7 wherein, the bottom of the foot has a sole for contacting the object.

17. An electrothermal actuator as in claim 14 wherein, the object has a surface having teeth for engaging the teeth of the feet.

18. An electrothermal actuator as in claim 14 wherein, the object has a serrated surface for engaging the teeth of the feet.

19. An electrothermal actuator as in claim 12 wherein, the actuator has a means of activating the heaters and capacitors to move each foot in a cycle comprising engaging the object, moving the object, retracting from the object, and retracing to the beginning position for the another cycle.

20. An electrothermal actuator as in claim 19 wherein, the bottom surface of each foot has a tooth for contacting the object.

21. An electrothermal actuator as in claim 20 wherein, each tooth is at the front surface of each foot.

22. An electrothermal actuator as in claim 19 wherein, the bottom of the foot has a sole for contacting the object.

23. An electrothermal actuator as in claim 20 wherein, the object has a surface having teeth for engaging the teeth of the feet.

24. An electrothermal actuator as in claim 20 wherein, the object has a serrated surface for engaging the teeth of the feet.

25. An electrothermal actuator as in claim 20 wherein, each socket has a fluid port for adding said fluid to each socket.

26. An electrothermal actuator as in claim 23 wherein, each socket has a fluid port for adding said fluid to each socket.

27. An electrothermal actuator as in claim 24 wherein, each socket has a fluid port for adding said fluid to each socket.

28. An electrothermal actuator as in claim 1 wherein, the socket has at least two ports for introducing at least two fluids which change state when the heater is activated.

29. An electrothermal actuator as in claim 28 wherein, a catalyst is deposited on the heater.

30. An electrothermal actuator as in claim 1 wherein, the socket has at least two ports for introducing at least two fluids which exobarically react when the heater is activated.

31. An electrothermal actuator as in claim 29 wherein, a catalyst is deposited on the heater.

32. An electrothermal actuator as in claim 30 wherein, the reacting chemicals which have dissociated recombine.

* * * * *

UNITED STATES PATENT AND TRADEMARK OFFICE
CERTIFICATE OF CORRECTION

PATENT NO. : 5,309,056
DATED : May 3, 1994
INVENTOR(S) : Gordon W. Culp

It is certified that error appears in the above-indentified patent and that said Letters Patent is hereby corrected as shown below:

Column 15, line 10, delete "one" and insert --on--.

Signed and Sealed this

Sixth Day of September, 1994

Attest:

BRUCE LEHMAN

Attesting Officer

Commissioner of Patents and Trademarks